United States Patent [19]

Hoshino et al.

[11] 4,367,499

[45] Jan. 4, 1983

[54] TAPE SEARCHING DEVICE IN PCM RECORDING AND REPRODUCING APPARATUS

[75] Inventors: Takashi Hoshino, Fujisawa; Takao Arai, Yokohama, both of Japan

[73] Assignee: Hitachi, Ltd., Tokyo, Japan

[21] Appl. No.: 301,133

[22] Filed: Sep. 11, 1981

Related U.S. Application Data

[63] Continuation of Ser. No. 143,121, Apr. 23, 1980, abandoned.

[30] Foreign Application Priority Data

Apr. 27, 1979 [JP] Japan .................................. 54-51518

[51] Int. Cl.³ ...................... G11B 15/18; G11B 19/02; G11B 5/06
[52] U.S. Cl. ................................. 360/72.2; 360/74.4; 360/33.1; 360/14.3
[58] Field of Search ...................... 360/72.2, 72.1, 71, 360/33, 39, 40, 74.4

[56] References Cited

U.S. PATENT DOCUMENTS

| | | | |
|---|---|---|---|
| 3,564,161 | 2/1971 | Takishima | 360/72.2 |
| 3,736,565 | 5/1973 | Sidline | 360/72.2 |
| 4,120,006 | 10/1978 | Nagami et al. | 360/72.2 |
| 4,139,870 | 2/1979 | Tachi | 360/72.2 |

FOREIGN PATENT DOCUMENTS 2025727  1/1980  Fed. Rep. of Germany ..... 360/72.2

*Primary Examiner*—Alfred H. Eddleman
*Attorney, Agent, or Firm*—Antonelli, Terry and Wands

[57] ABSTRACT

An address on a magnetic tape to be searched and a current address of the magnetic tape which is read by playing back the tape are supplied to first arithmetic operation means to produce a signal indicative of the tape length to be fast moved and a signal indicative of the direction of the fast tape movement so that the tape is fast moved in the selected direction in response to the derived direction signal. Second arithmetic operation means watches address pitch signals produced during the fast tape movement and the tape length to be fast moved derived from the first arithmetic operation means, to release the fast tape movement when the predetermined length of tape has been fast moved.

9 Claims, 6 Drawing Figures

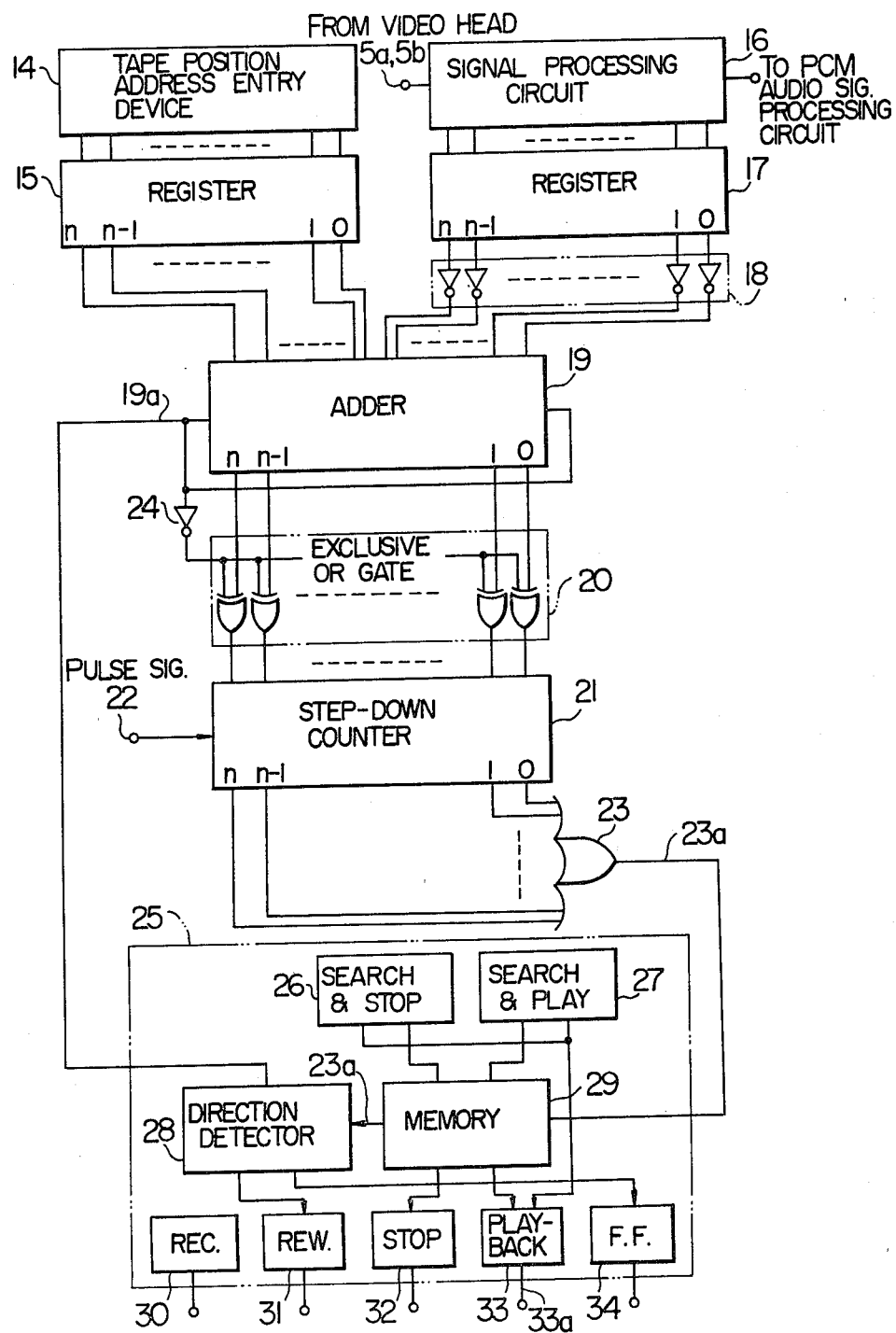

TAPE SEARCHING DEVICE IN PCM RECORDING AND REPRODUCING APPARATUS

This is a continuation of application Ser. No. 143,121, filed Apr. 23, 1980, now abandoned.

BACKGROUND OF THE INVENTION

1. Field of the Invention

The present invention relates to a PCM recording and reproducing apparatus in which analog audio information is recorded in digital form on a recording medium, i.e. a video tape of video tape recorder and a reproduced digital signal is reconverted to the original analog signal, and more particularly to a tape searching device for enabling the rapid search of a desired tape position.

2. Description of the Prior Art

As a tape searching device for a video tape recorder, a method could be proposed to extract for example, vertical synchronizing signals from a reproduced video synchronizing signal and count the number of those signals. However, those vertical synchronizing signals are mere pitch signals appearing at each predetermined length of a tape and they are not address signals for the tape. Accordingly, when a desired position of the tape is to be searched after a certain length of tape has been wound, the tape has to be first rewound to an initial position and then the vertical synchronizing signals are counted while the tape is wound forwardly. Therefore, the search operation is troublesome, and a long search time is required.

Another method could also be proposed in a PCM recording and reproducing apparatus to record and reproduce a digital signal which is a digital version of an analog audio signal, as well as digital address signals as addressing signals. This method, however, also has a disadvantage in that it cannot permit quick search as will be described below.

In the PCM recording and reproducing apparatus, a PCM signal format is in accord with a standard television signal such that the audio digital signals are accommodated in predetermined horizontal scan periods (e.g. 245 horizontal scan periods or 245 H) of one field (262.5 H) and the system control signals such as the address signals and content indexing signals are accommodated in another horizontal scan period (e.g. in one horizontal scan period preceding to the audio digital signals accommodating periods). In a helical scan type video tape recorder, those audio digital signals and address signals are recorded on the video tracks 2 of a magnetic tape 1 shown in FIG. 1, in which numeral 3 denotes an audio track of the tape 1 when it is to be used for video recording instead of PCM audio recording and numeral 4 denotes a control track. An arrow A indicates the direction of tape travel and an arrow B indicates the direction of rotation of a video head.

Referring to FIGS. 2 and 3, the movement of the magnetic tape 1 is explained. FIGS. 2 and 3 show top views of a rotary head and associated devices of the video tape recorder, in which FIG. 2 shows a normal playback condition while FIG. 3 shows fast-forward or rewind condition. In the normal playback condition, as shown in FIG. 2, the magnetic tape 1 is in contact with a pair of rotary heads 5a and 5b disposed on a disk 5 and an audio/control head 6, so that the video tracks 2 are played back by the rotary heads 5a and 5b while the audio track 3 and the control track 4 are played back by the audio/control head 6. Numeral 7 denotes a supplying impedance roller, numeral 8 denotes the guide poles and numeral 9 denotes a take-up impedance roller. During the fast-forward or rewind condition, the tape 1 is half-loaded as shown in FIG. 3 in order to assure smooth and high speed movement of the magnetic tape 1 and to protect the magnetic tape 1. Under these conditions, the video tracks 2 are not played back by rotary heads 5a and 5b but only the audio track 3 and the control track 4 are played back by audio/control head 6. As a result, during the fast-forward or rewind conditions which are necessary for the rapid search, the address signals recorded by the rotary heads 5a and 5b are not played back. Accordingly, the tape search operation has to be carried out in the normal speed playback condition and hence rapid search operation cannot be attained.

SUMMARY OF THE INVENTION

It is an object of the present invention to provide a searching device in a PCM recording and reproducing apparatus which enables rapid search of any desired tape position in any running condition of the magnetic tape.

According to the present invention, based on an address on the tape to be searched and manually inputted by an operator and a current address of the tape which is read from the video track by temporarily rendering the video head in a playback condition to the stopped tape, the number of pitches of the control signals corresponding to the number of addresses between the above two addresses, which are to be fast moved, and the direction of the fast movement of the tape (i.e. rewind or fast-forward) are determined by arithmetic operations, and then the tape is fast moved with the video heads being deactivated and the audio/control head being activated while monitoring the coincidence of the number of pitches of the control signals sequentially read from the control track by the audio/control head with the number of addresses to be fast moved, and when the coincidence is detected the magnetic tape is stopped or put in a playback condition to finish the search of the desired tape position.

BRIEF DESCRIPTION OF THE DRAWINGS

FIGS. 2 and 3 show heads and associated devices of video tape recorder, in which FIG. 2 shows a playback (or recording) condition and FIG. 3 shows a fast-forward or rewind conditions.

FIG. 6 shows a block diagram of one embodiment of the present device.

DETAILED DESCRIPTION OF THE PREFERRED EMBODIMENTS

Before describing the queuing device of the present invention, a well known disk control signal for the video tape recorder is first explained.

Figure 1:
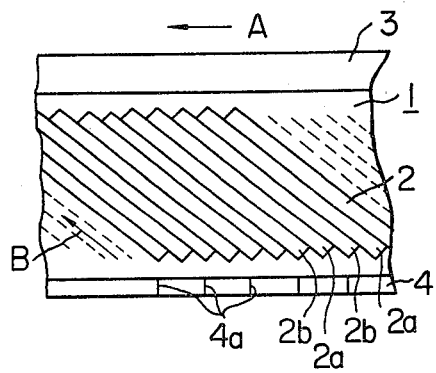
FIG. 1 shows a track pattern of a magnetic tape.
Figure 4:
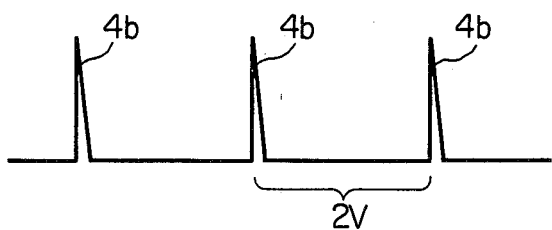
FIG. 4 shows a reproduced waveform of a disk control signal.

In connection with the explanation of FIG. 1, the control track 4 has been described. A control signal 4a is recorded on the control track 4 as shown in FIG. 1. The control signal 4a is recorded to assure that the rotary heads 5a and 5b shown in FIG. 2 correctly trace the video tracks 2a and 2b of the magnetic tape 1 shown in FIG. 1. The control signal 4a controls the rotation speed of the disk 5 such that for each rotation of the disk 5 the rotary head 5a traces the video track 2a while the rotary head 5b traces the video track 2b. For this reason, the control signal 4a is referred to as the disk control signal, which is read by the head 6 to produce a pulse signal 4b as shown in FIG. 4. A pulse interval of this signal is equal to 33.3 m sec. that is, twice as long as the period of the vertical synchronizing signal.

Figure 5:
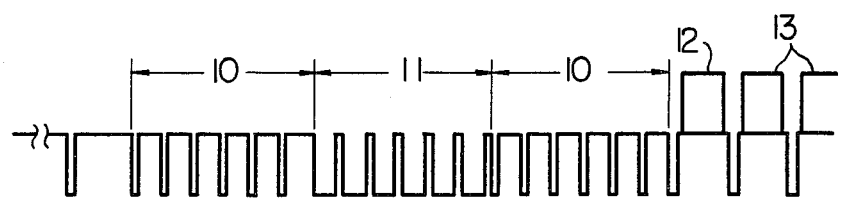
FIG. 5 shows a format of video signal.

Referring to FIG. 5, a signal format of PCM audio signal to be recorded in the video tape recorder is explained.

FIG. 5 shows, as an example, a signal sequence of a leading section of an odd-numbered field. The leading section of each field includes equalizing pulses 10 and vertical synchronizing pulses 11. Numeral 12 denotes a control signal block (1 H) which accommodates binary coded system control signals such as address signal and content indexing signal, and numeral 13 denotes a data block (245 H) which accommodates digitized analog audio information. The address signals accommodated in the control signal block 12 may be accommodated one in every other vertical synchronizing pulses, like the disk control signals 4a. The address signals are sequentially recorded from the beginning of the tape to the end of the tape.

Referring now to FIG. 6, one embodiment of the present invention will be explained in detail. In FIG. 6, numeral 14 denotes an address entry device having a keyboard for specifying a desired tape position, numeral 15 denotes a register for storing address data of any desired address specified, numeral 16 denotes a signal processing circuit including an address detection circuit for detecting the address signals on the tape 1 for processing the signal recorded on the tape 1, numeral 17 denotes a register for storing the address data on the tape, numeral 18 denotes an inverter, numeral 19 denotes an adder, numeral 20 denotes an exclusive OR gate, numeral 21 denotes a step-down counter, numeral 22 denotes a control pulse input terminal, numeral 23 denotes an OR gate and numeral 24 denotes an inverter. The inverter 18, the adder 19, the exclusive OR gate 20 and the inverter 24 constitute a fast movement tape length setting means.

Numeral 25 denotes a system control block, numeral 26 denotes an actuation button for generating an actuation signal to instruct the start of search and stop the tape after the completion of search, numeral 27 denotes an actuation button for generating an actuation signal to instruct the start of search and play back the tape after the completion of search, numeral 28 denotes a fast tape movement direction detection circuit, numeral 29 denotes a memory circuit, numeral 30 denotes a record operation circuit, numeral 31 denotes a rewind operation circuit, numeral 32 denotes a stop operation circuit, numeral 33 denotes a playback operation circuit and numeral 34 denotes a fast-forward operation circuit.

The operation of the circuit of FIG. 6 is now explained.

Figure 2:
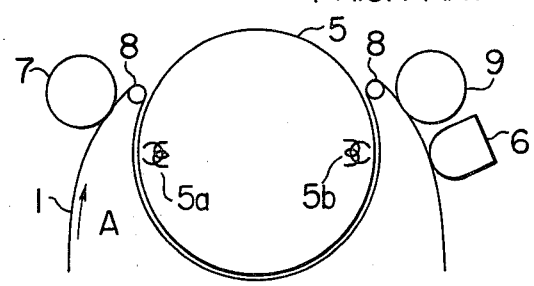

As an example, let us assume that the address "200" on the tape is to be located to initiate the playback from the address "200 ". The address "200 " is designated by the address entry device 14 and the designated address is stored in the register 15. Then, the actuation button 27 is actuated so that the actuation signal is stored in the memory circuit 29 and supplied to the playback operation circuit 33, which produces an output signal 33a to render the mechanism to assume the playback condition (FIG. 2). Accordingly, the rotary heads 5a and 5b read the signal recorded on the video track 2.

The address detection circuit in the signal processing circuit 16 extracts the address signal from the signal recorded on the video track 2 and stores it in the register 17. Let us assume that the current address of the tape is "100". Based on the designated address "200" stored in the register 15 and the tape address "100" stored in the register 17, the fast tape movement direction and the tape length to be fast moved are calculated. When the subtraction operation is carried out in a digital circuit, a subtrahend is converted to "1"'s complement which is then added to a minuend. Thus, the tape address data derived from the register 17 is inverted by the inverter 18 to produce the "1"'s complement, which is added to the designated address data derived from the register 15. If:

(designated address) ≧ (tape address), a carry signal 19a at the most significant digit is "1", and the resulting sum plus "1" represents a correct result. If:

(designated address) < (tape address), the carry signal is "0" and the resulting sum is the "1"'s complement of a correct result. In this case, therefore, it is necessary to invert all bits. Thus, the carry signal 19a is applied to the least significant digit carry signal input terminal of the adder 19, and the inverted version of the carry signal 19a and the respective output bits of the adder 19 are applied to the exclusive OR gate 20 to calculate the correct result, i.e. [(designated address) — (tape address)], that is, the tape length "100" to be fast moved.

Figure 3:
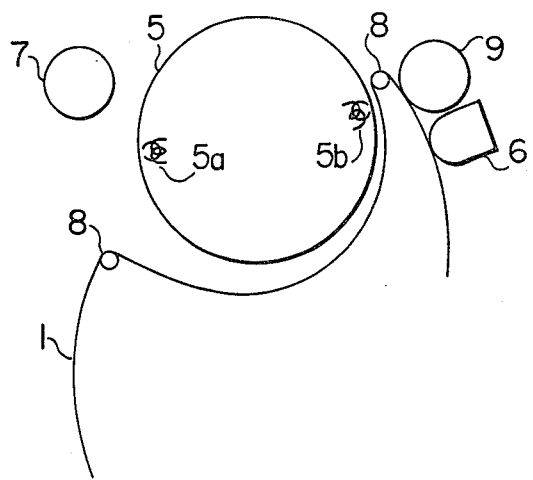

The determination as to whether the tape is fast-forward moved or rewound in searching the desired tape position is made by monitoring the carrying signal 19a. If the carry signal 19a is "0", it indicates that (designated address) < (tape address) and hence the rewind is required, and if the carry signal 19a is "1", it indicates that (designated address) ≧ (tape address) and hence the fast-forward movement is required. In the present instance, the carry signal 19a is "1", which is supplied to the fast tape movement direction detection circuit 28 which drives the fast-forward operation circuit 34. As a result, the mechanism assumes the fast-forward condition as shown in FIG. 3.

In the arithmetic operation described above, "100" is initially loaded to the step-down counter 21, which also receives the control pulses 4b by audio/control head 6 shown in FIG. 4. Accordingly, the content of the step-down counter 21 is decremented by the control pulses 4b which are produced during the fast-forward condition, and when all bits become "0" a coincidence detection signal 23a which is an output of the OR gate 23 which ORs the all bits of the counter output assumes "0". Since this time point corresponds to the time when the designated address coincides with the tape address, the coincidence signal 23a is supplied to the memory circuit 29 to actuate the playback operation circuit 33 in accordance with the initially stored playback signal. By the actuation of the playback operation circuit 33, the fast-forward condition is reset and the playback condition is set. In this manner, the tape is played back from the designated address "200".

If it is desired to stop the tape after the completion of search, the actuation button 26 may be actuated. In this case, the stop operation circuit 32 is actuated and the tape is stopped. When the result of the adder 19 indicates that (designated address)=(tape address), the coincidence signal 23a is "0" at the time when the result is loaded to the step-down counter 21. Therefore, the fast-forward movement does not occur in this case.

The operation described above is a mere example and many modifications can be made. The first arithmetic operation means need only determine the tape length to be fast moved and the direction of the fast tape movement and the second arithmetic operation means need only detect the coincidence of the tape length to be fast moved and the accumulation of the control pulses.

As described hereinabove, according to the present invention, the search of any tape position from any current tape position can be rapidly performed either by fast-forward operation or rewind operation regardless of the current tape position.

What is claimed is:

1. A tape searching device in a PCM recording and reproducing apparatus comprising:
    (a) first addressing means for designating any desired tape address and producing an electrical signal indicative of the designated address;
    (b) first actuation means for putting a video head in a playback condition in stopping a tape after the tape address has been designated by said first addressing means;
    (c) second addressing means for detecting an electrical signal indicative of a tape address representative from the tape of a stop position, said tape containing tape addresses unique to respective tape positions to be read by the video head and control signal at a fixed pitch to be read by an audio head;
    (d) first arithmetic operation means for calculating a difference between said designated address and said tape address based on said electrical signals from said first and second addressing means to produce a signal indicating the direction of fast tape movement and a signal determining the tape length to be fast moved, said tape length being represented by the number of pitches of said control signals indicative of said difference between said addresses;
    (e) second actuation means responsive to said signal indicating the direction of fast tape movement derived from said first arithmetic operation means to bring the tape in fast rewind or fast forward condition, and stop the tape in response to a tape stop signal;
    (f) third addressing means for producing said control signals from the tape in the fast tape movement condition brought about by said second actuation means; and
    (g) second arithmetic operation means for determining the coincidence between the signal indicative of the tape length to be fast moved derived from said first arithmetic operation means and the number of pitches of said control signals derived from said third addressing means to supply the stop signal to said second actuation means when the coincidence is detected.

2. A tape searching device as claimed in claim 1, in which said first actuation means includes:
    a first searching means for generating an actuation signal to put the video head in the playback position and stop the tape when the stop signal is supplied by the second arithmetic operation means, and
    a second searching means for generating an actuation signal to put the video head in the playback position and play back the tape when the stop signal is supplied by the second arithmetic operation means.

3. A tape searching device as claimed in claim 2, in which said first searching means includes a memory circuit enabled by the stop signal from said second arithmetic operation means, an actuation means for generating an actuation signal to instruct the start of search and stop the tape after the completion of search and supplying the actuation signal to said memory circuit, and a stop operation circuit responsive to the actuation signal taken out by said stop signal from said memory circuit for stopping the tape.

4. A tape searching device as claimed in claim 2, in which said second searching means includes a memory circuit enabled by the stop signal from said second arithmetic operation means, an actuation means for generating an actuation signal to instruct the start of search and play back the tape after the completion of search and supplying the actuation signal to said memory circuit, and a playback operation circuit responsive to the actuation signal taken out by said stop signal from the memory circuit for allowing the playback of said apparatus.

5. A tape searching device as claimed in claim 1, in which said first arithmetic operation means includes a first inverter for inverting the electrical signal from said second addressing means, an adder coupled to said first addressing means and said inverter for adding the outputs of said first addressing means and the inverted electrical signal, said inverter and said adder constituting a subtraction circuit, said subtraction circuit producing a signal representative of the direction of fast tape movement when the result of subtraction is positive and a signal representative of the direction of rewind when the result of subtraction is negative.

6. A tape searching device as claimed in claim 5, in which said first arithmetic operation means further includes a second inverter for inverting the signal representing the direction of fast tape movement, and an exclusive OR circuit receiving an inverted output of the second inverter and the content of said subtraction circuit and producing a signal representing the tape length to be fast moved.

7. A tape searching device in an information recording and reproducing apparatus comprising:
    (a) first addressing means for designating any desired tape address and producing an electrical signal corresponding to the designated address;
    (b) first actuation means for putting the tape in a playback condition after the tape address has been designated by said first addressing means;
    (c) second addressing means for detecting an electrical signal corresponding to a tape address representative of a tape position from the tape on which tape addresses identifying individual tape positions and control signals having a constant pitch are recorded;
    (d) first arithmetic operation means for arithmetically operating said electrical signals from said first addressing means and said second addressing means and thereby determining a difference between the designated address and said tape address to produce a signal indicating the direction of fast tape movement and a signal determining the tape length to be moved, said tape length being represented by the number of pitches of said control signals indicative of said difference between said addresses;

(e) second actuation means responsive to the signal indicating the direction of fast tape movement derived from said first arithmetic operation means to bring the tape into a fast rewind or a fast forward condition;

(f) third addressing means for producing said control signal in the fast tape movement condition brought about by said second actuation means; and (g) second arithmetic operation means for determining the coincidence between the signal indicative of the tape length to be moved derived from said first arithmetic operation means and the control signal derived from said third addressing means to release said fast tape movement condition when the coincidence is detected.

8. A tape searching device for use in magnetic recording and reproducing apparatus for recording and reproducing an information signal comprising:

(a) a magnetic tape including a plurality of slanted video tracks on which an information signal to be recorded and reproduced and address signals indicative of tape position are recorded and a control track along the tape length direction on which control signals corresponding to said respective tracks are recorded at a fixed pitch;

(b) first addressing means including rotary cylinder heads for detecting an address signal from said tape;

(c) second addressing means including a fixed head for detecting a control signal from said tape;

(d) third addressing means for designating any desired tape address and producing an electrical signal indicative of the designated address;

(e) first actuation means including at least actuation switches operable by actuation after a desired address has been designated by said third addressing means to thereby put said magnetic recording and reproducing apparatus into a tape playback condition for the purpose of searching the tape address;

(f) first detecting means for detecting said tape address signal derived from said first addressing means in said playback condition for address-searching as information representative of a tape position at the time when the switch is actuated;

(g) arithmetic operation means for comparing and arithmetically operating the desired address from said third addressing means and the tape address detected from said first detecting means to thereby provide a signal indicating the direction of fast tape movement and a signal indicating the tape length to be moved in accordance with a difference between the addresses thus compared;

(h) second actuation means responsive to said signal indicating the direction of fast tape movement derived from said arithmetic operation means to bring the apparatus into a fast rewind or a fast forward condition as a fast tape movement condition; and (i) control means for detecting the number of tape control signals derived from said second addressing means in said fast tape movement condition, and for detecting the coincidence between the detected number and the signal indicating the tape length to be moved derived from said arithmetic operation means to release the fast movement condition of the apparatus when the coincidence occurs.

9. A tape searching device comprising:

(a) a magnetic recording and reproducing unit comprising a rotary cylinder with rotary heads, a movable tape wound on the outer periphery of said cylinder by more than 180 degrees in a slanted relation therewith, and a fixed head on which the tape moves in slidable contact therewith, said tape forming, in a record mode, slanted recording tracks for recording address signals for each track and information signals to be recorded therein, which are recorded on the tape through said rotary heads, and a control track extending along the length of the tape for recording control signals which is recorded by said fixed head, wherein in a playback mode the information signals are taken out by the rotary cylinder from the recording tracks and the control signals are taken out by said fixed head from the control track, and further wherein in a fast rewind or a fast forward mode the control signals are taken out by said fixed head;

(b) addressing means for designating a desired address on the recording tracks to be searched and producing an address signal corresponding to said desired address;

(c) first control means including actuation switches and controlling said magnetic recording and reproducing unit to operate in a playback mode for at least a given period of time to allow address searching following the designation of the desired address by said addressing means and the completion of actuation of said actuation switches, and for controlling the magnetic recording and reproducing unit to extract one of the address signals taken out from the recording tracks of the tape by the rotary heads;

(d) second control means for comparing and operating the one address signal extracted by said first control means and the desired address signal designated by said addressing means to produce a signal indicating the tape length to be moved and a signal indicating the direction of tape movement in accordance with a difference between said addresses;

(e) third control means for bringing said magnetic recording and reproducing unit into a fast rewind or a fast forward mode in response to the direction of tape movement indicated by the direction indicating signal produced from said second control means; and (f) fourth control means for detecting the coincidence between the number of the control signals derived from said fixed head and the signal indicating the tape length to be moved in the fast rewind or fast forward mode controlled by said third control means and for releasing the fast rewind or fast forward mode of said magnetic recording and reproducing unit when the coincidence is determined.

* * * * *